H. B. OSGOOD.
AUTOMATIC WEIGHING SCALE.
APPLICATION FILED MAR. 11, 1912.
1,125,874.
Patented Jan. 19, 1915.
5 SHEETS—SHEET 5.
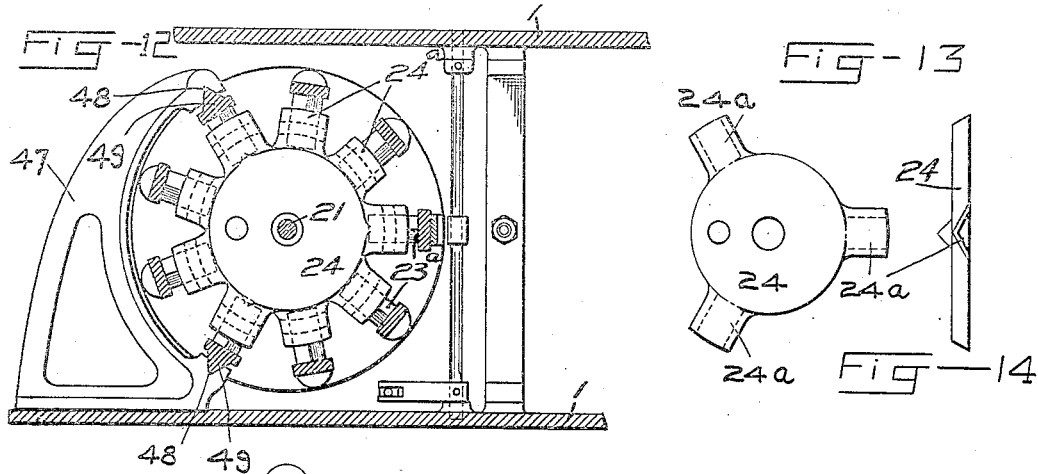
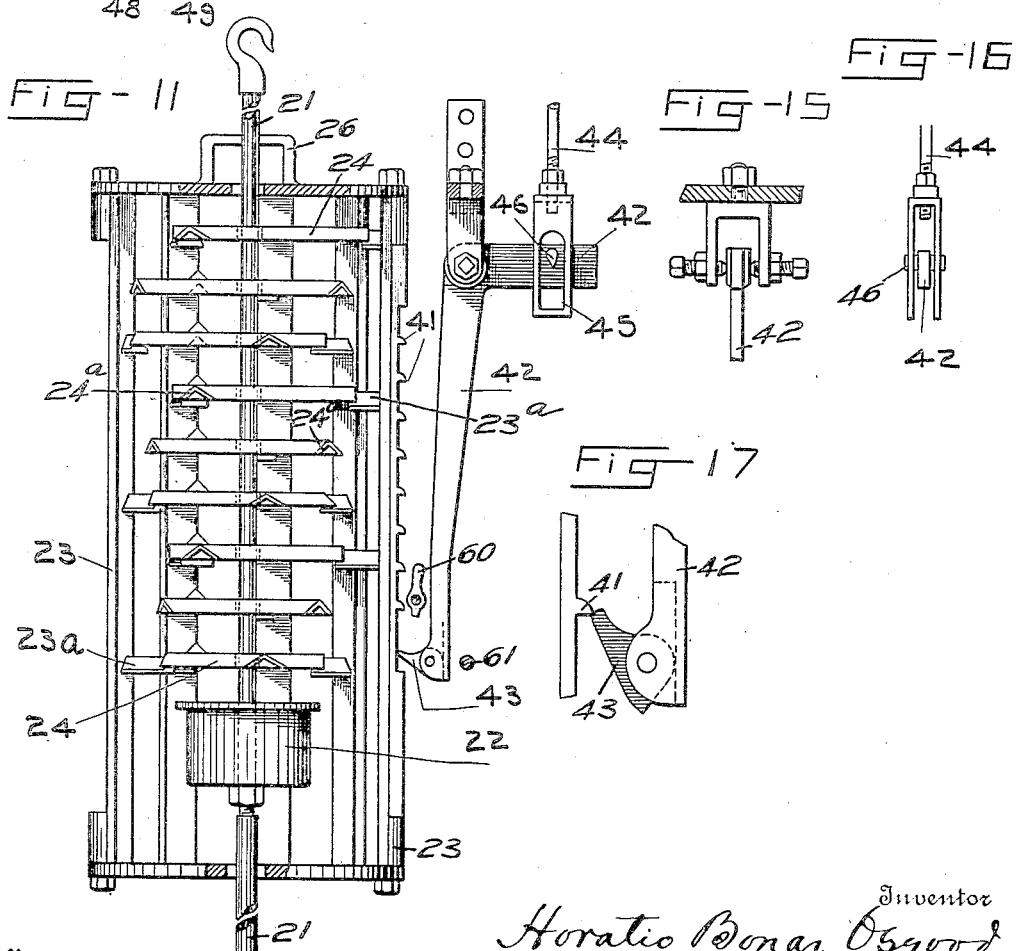
Witnesses
Inventor
Horatio Bonar Osgood
By Staley and Bowman
Attorneys

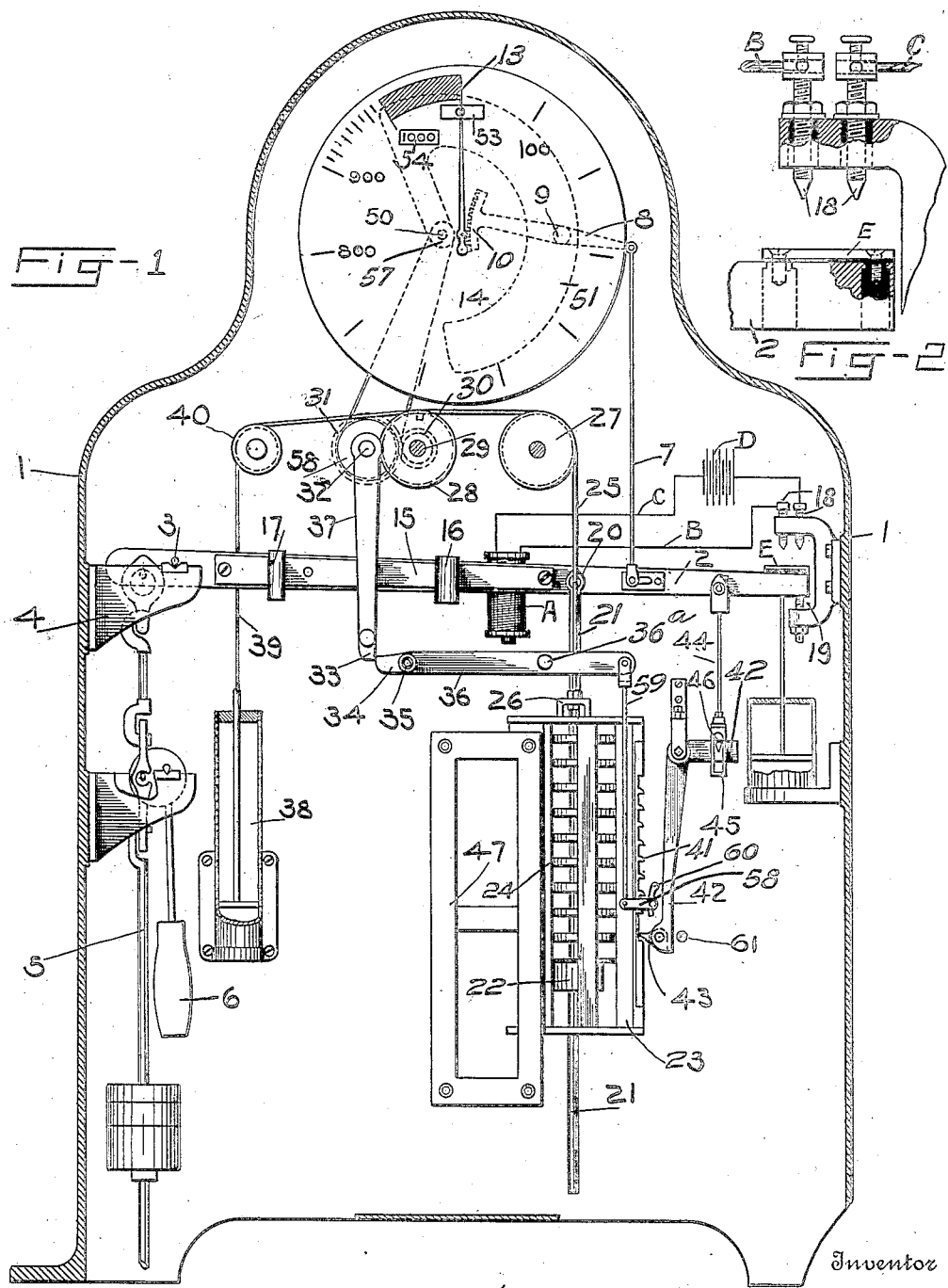

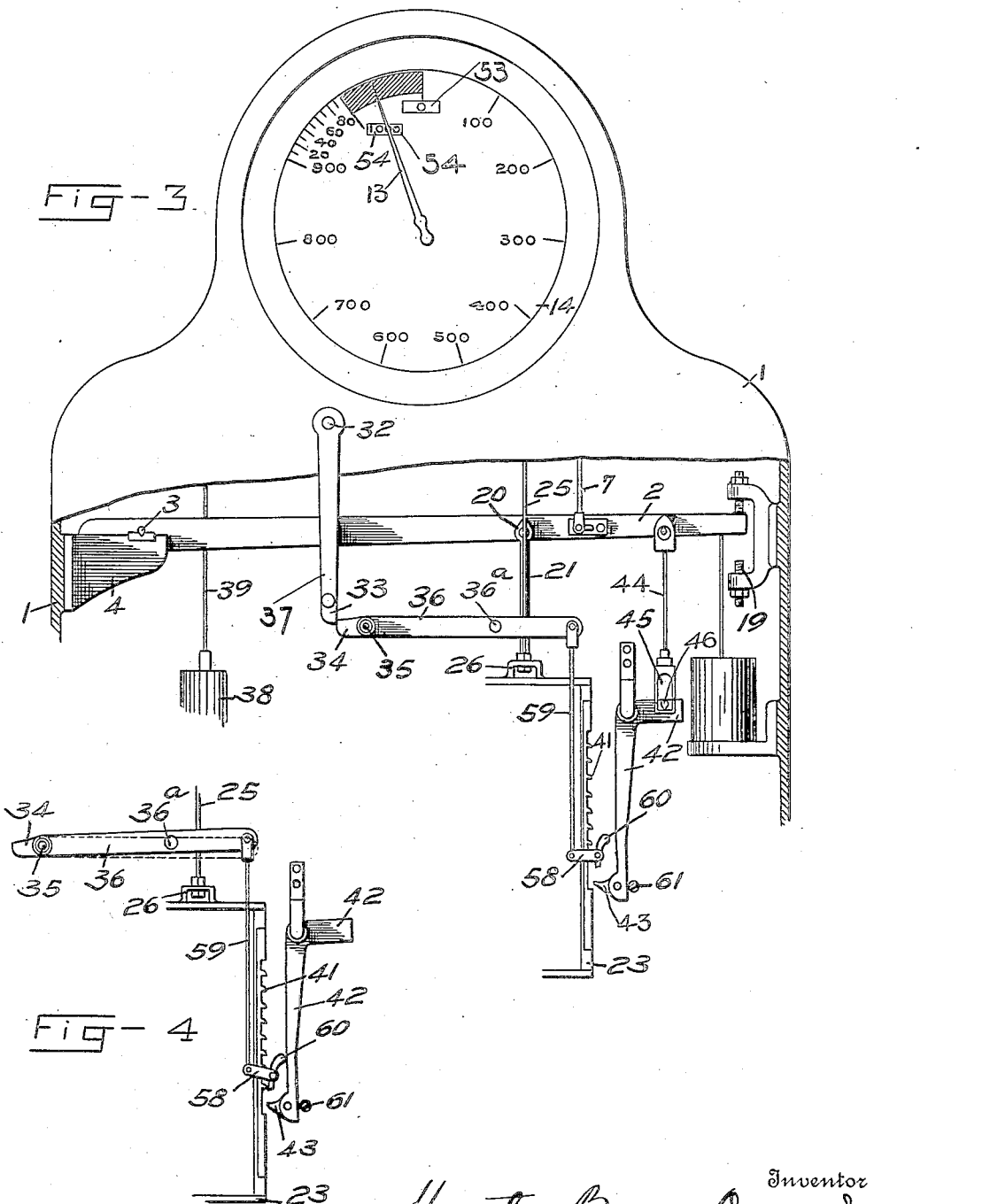

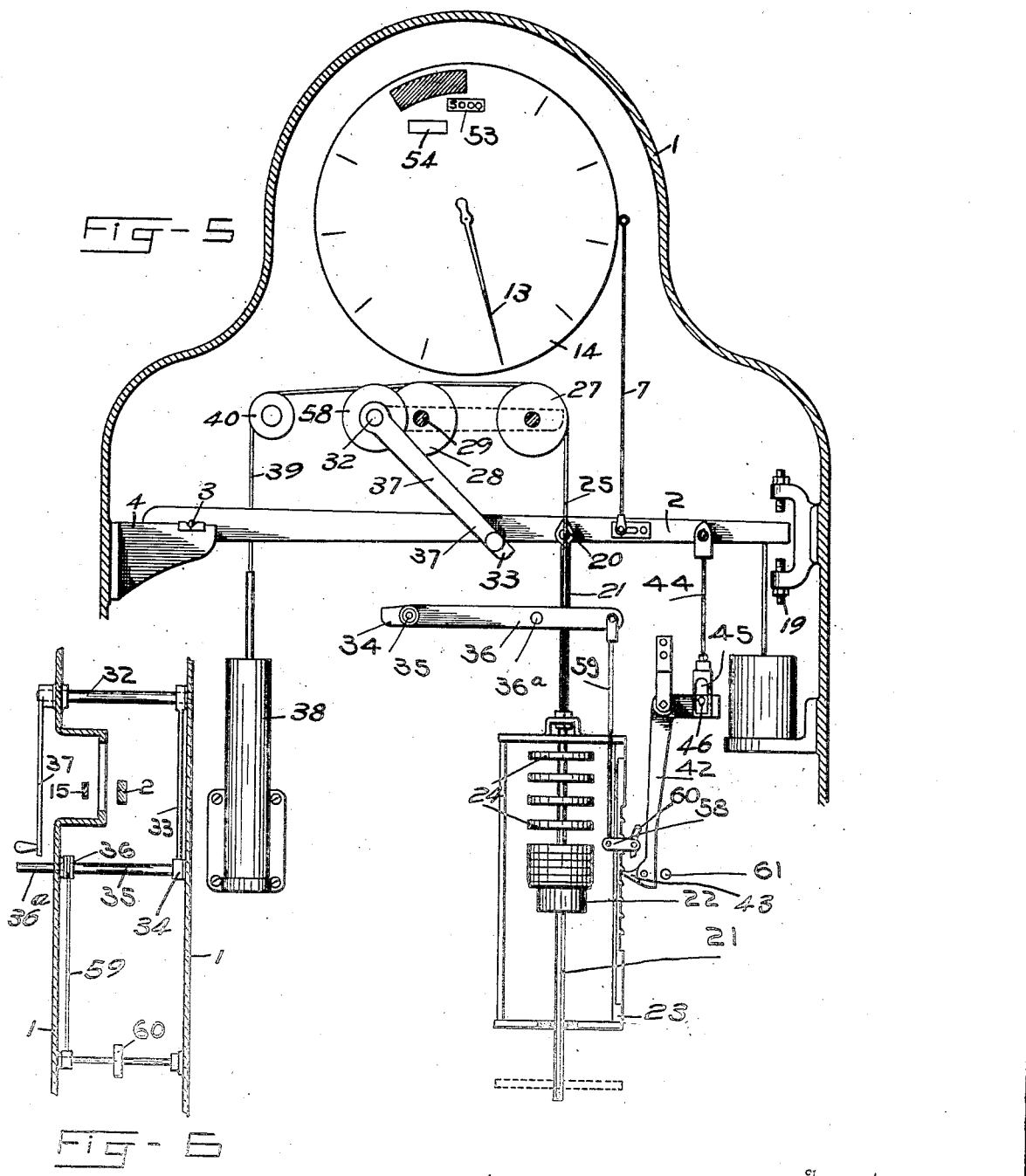

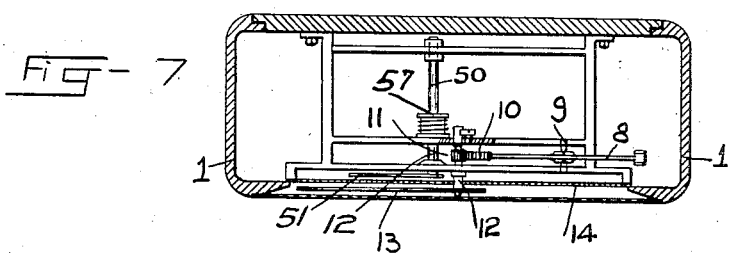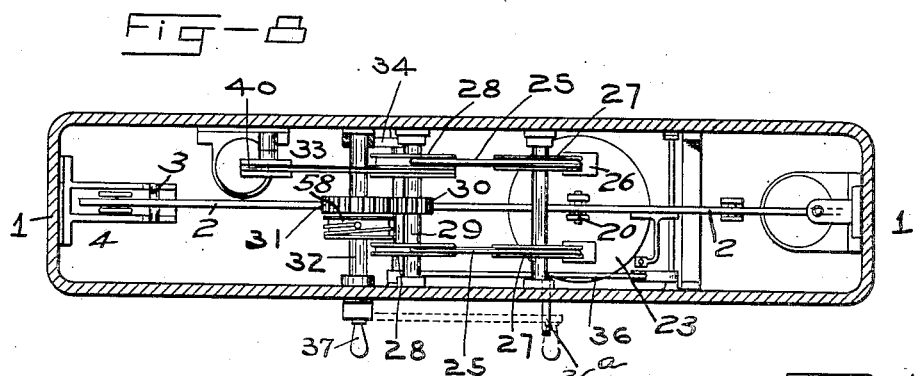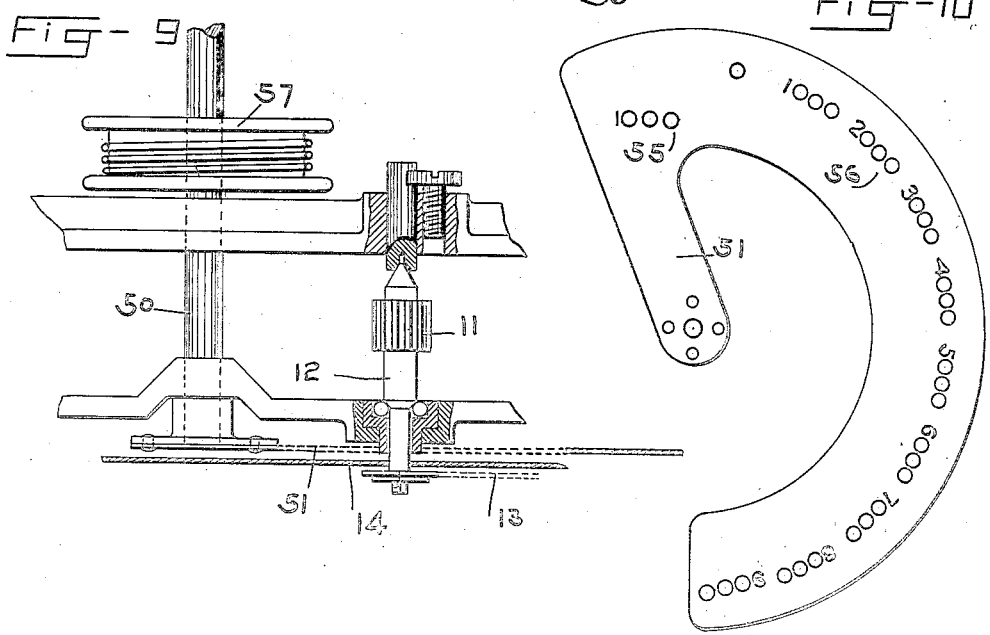

UNITED STATES PATENT OFFICE.

HORATIO BONAR OSGOOD, OF SPRINGFIELD, OHIO, ASSIGNOR TO JOHN E. BOWMAN, OF SPRINGFIELD, OHIO.

AUTOMATIC WEIGHING-SCALE.

1,125,874.     Specification of Letters Patent.     Patented Jan. 19, 1915.

Application filed March 11, 1912. Serial No. 683,157.

*To all whom it may concern:*

Be it known that I, HORATIO BONAR OSGOOD, a citizen of the United States, residing at Springfield, in the county of Clark and State of Ohio, have invented certain new and useful Improvements in Automatic Weighing-Scales, of which the following is a specification.

This invention relates to improvements in scales and particularly to that class of scales known as automatic, in which the weight of the load is automatically indicated on a dial or indicator.

The particular object of this invention is to secure a wide range of indication with indicators of comparatively small area and to secure this result without departing from approved scientific scale construction. In accomplishing this object I employ means for automatically adding counterpoise weight when the normal counterpoise weight is insufficient to counterbalance the load, and means for indicating the weight value of the counterpoise weight so added. I accomplish this object and the result by the construction illustrated in the accompanying drawings in which—

Figure 1 is a sectional elevation view embodying my invention. Fig. 2 is a detail view showing the electromagnet parts at the free end of the beam. Fig. 3 is an elevation partly in section with some of the parts eliminated. Fig. 4 is a detail view of a portion of the same. Fig. 5 is a sectional elevation of certain of the operating parts shown in a different position of adjustment. Fig. 6 is a sectional elevation at right angles to the beam showing the arrangement of the main and supplemental beam and some of the parts for adjusting the weight mechanism. Fig. 7 is a horizontal sectional view of the indicating mechanism. Fig. 8 is a horizontal view taken beneath the indicating mechanism showing some of the cage supporting devices and their adjustments. Fig. 9 is an enlarged view of part of the indicating mechanism. Fig. 10 is an elevation of the auxiliary indicator or gage. Fig. 11 is an enlarged detail partly in section of the weight supporting and adjusting devices. Fig. 12 is a transverse sectional view of the same. Figs. 13 and 14 are respectively a plan and side elevation of poise weights. Figs. 15, 16 and 17 are detail views of the parts shown in Fig. 10.

Like parts are indicated by similar characters of references in the several views.

In the accompanying drawings I have illustrated my invention only, it being understood that it may be attached to and employed with any of the usual forms of load receivers, preferably of the platform variety. In the said drawings outer casing 1 (Fig. 1) is employed to inclose the mechanism, and in this casing is the usual weighing beam 2 pivoted at 3 on a suitable bracket 4, in casing 1, and from this beam extends the usual load supporting rod 5, which is connected to the platform levers in the usual and suitable way. Rod 5 is pivotally connected to pendulum 6, which forms a counter-balance for a load or that part thereof, the weight of which can be legibly indicated on a dial of reasonable size. From beam 2 link 7 extends upwardly and is pivoted to the outer end of segment arm 8 pivoted at 9 in the upper part of the casing, as shown in Fig. 1, and provided with a toothed segment 10, which meshes with pinion 11 upon the indicator shaft 12 which carries an indicator hand 13 adapted to be moved over dial 14 and thus indicate the position of beam 2, as counterbalanced by pendulum 6, and consequently by the load on the platform. The graduations on dial 14, as I have illustrated it, runs from 0 to 1000, the graduations in this case representing units of 10. These graduations, however, may represent units of greater or less weight value, this particular part of the mechanism forming no part of my invention.

In Fig. 1, I have shown at the side of the main beam 2 a supplemental beam 15 having poises 16 and 17 which can be adjusted for tare and balance purposes in the usual manner. This supplemental beam is preferably secured to the side of the main beam and the outer casing is offset or countersunk as shown in Fig. 6 so that beam 15 may be outside of the casing while the main beam is inside the casing. The free end of the beam 2 preferably plays between suitable electromagnetic poles or stops 18 and stop 19, which are preferably made adjustable, the limitation of the movement of the beam permitting sufficient play to cause the hand to coöperate with the graduated and ungraduated sections of the dial. Poles 18 are connected with electromagnet A by connection 110

B and connection C through battery D, plate E being the contact plate.

It should be noticed that a section of dial 14 is not graduated. When the normal counter-poise weight is insufficient to counterbalance the load the indicator hand travels beyond the graduated section and stops in the ungraduated section. It is when this occurs that my invention applies, and which I will now describe. Pivoted to beam 2 at point 20 is poise rod 21, having a poise pan 22. This is the usual poise weight receiver or poise pendant of the ordinary scale. The poise pendant is inclosed in cage 23, but is not connected therewith, poise rod 21 being extended through the cage and free from contact therewith. This cage carries a series of poise weights 24 which are adapted under certain conditions to be deposited on poise pan 22 and each weight when thus deposited is preferably adapted to counterbalance a load equal to the capacity of dial 14, in this case 1000 pounds. Cage 23 is normally supported from two flexible connections 25 which are attached to the upper part of the cage at 26 and extend upwardly over supporting pulleys 27 journaled on suitable bearings in the casing and connected to pulleys 28 on shaft 29 also journaled in the casing 1 (Fig. 8). This shaft 29 carries pinion 30 which meshes with gear 31 attached to shaft 32, and this shaft carries at one end arm 33 which projects downwardly within the casing and normally rests in contact with projecting finger 34 near one end of shaft 35, (Fig. 1), which carries near its other end trip arm 36 which projects longitudinally below and substantially parallel with main beam 2. Shaft 32 projects through the front of the casing and on the end of the shaft at the outside of the casing is crank 37.

It will be seen that, upon turning crank 37 (Fig. 1) so as to rotate shaft 52, the cage can be raised or lowered as gear 31 (Fig. 8) meshes with pinion 30 and thus rotates shaft 29 and pulleys 28, which will wind up or pay out flexible connections 25. In normal position, however, the weight of the cage has a tendency to turn shaft 32, but it is prevented from so doing by arm 33 resting against finger 34. So that so long as longitudinal trip arm 36 is in its normal position the cage will be held in its normal position in which both the cage and poise weights supported thereby are free from poise rod 21 and poise pan 22. The cage is preferably connected to the piston of the dash pot 38, by flexible connection 39 passing over pulley 40 and around one of the pulleys 28 to which it is fastened, so that as the cage goes down the piston goes up, this construction being used to prevent a sudden dropping of the cage when released as hereinafter described. Main beam 2 is also provided with a dash pot to prevent rapid and excessive vibration of the beam.

As before stated cage 23 supports a number of poise weights 24, there being shown in these drawings nine of such weights representing 1000 pounds each. These weights are preferably made in the form shown in Fig. 13, each being provided with three projecting arms 24ª and these arms of the different weights are made of different lengths. Those carried in the lower part of the cage having the shortest arms, the arms successively increasing in length to the top. These arms are adapted to be engaged by projections 23ª on the cage, these projections also being graduated in length to correspond, the longer ones at the bottom, the shorter ones at the top, the purpose being to provide clearance so that the weights can be deposited or recovered without interference. For still further clearance the projections from the cage are staggered.

On one side of the cage there is a series of projections or shoulders 41 and there is pivoted in the casing adjacent to the cage, bell crank 42 which carries at its lower end pivoted pawl 43 which normally stands in line with the shoulders or projections 41 and when in its normal position would successively engage these shoulders 41, if the cage was lowered, the first one of these projections being so engaged that when it rests in contact with pawl 43, the first poise weight will rest on poise pan 22. Pawl 43, being pivoted in the lower end of bell crank, will yield upwardly, as shown in Fig. 17 to permit the parts to pass in returning to normal position. The space between the poise pan and the first poise weight and successively between the different weights is such as to allow the full vibration of beam 2 without causing the poise pan to contact with the first poise weight or any poise weight on the poise pan to contact with its nearest weight on the cage.

The horizontal arm of bell crank 42 stands substantially parallel to beam 2 and is connected thereto by link 44, the lower end of which embraces the horizontal arm of bell crank 42 and is provided with slotted openings 45 which permit beam 2 to swing almost to its upper position before the lower ends of the slotted openings 45 engage the pivot 46 fitted in the bell crank arm. When the beam swings to its extreme upper position (Fig. 3) link 44 will connect with pivot 46, drawing up slightly the horizontal arm of bell crank 42 withdrawing pawl 43 from line of shoulders 41. Cage 23 is preferably arranged to slide up and down in bracket 47, (Fig. 1), supported on the inside of the case and having ways 48 in which slide tapered bearings 49 which permit the cage to move up and down without lateral displacement.

In the upper part of the casing near pinion 11 (Figs. 1, 7, 9) which carries the indicating hand, there is a shaft 50 which carries at one end a supplemental dial or indicator 51. This supplemental dial or indicator 51 is placed behind dial 14 and coöperates with an opening or openings therein. In this case dial 14 is provided with two openings 53 and 54 and there are two sets of numbers on dial 51 coöperating therewith; one set consisting of a single number representing the capacity of dial 14, in this case 1000, and the other set consisting of numbers from zero to the ultimate capacity of the scale in units preferably equivalent to the capacity of the dial 14, in this case being in units of 1000 up to 9000. In normal position dial 51 shows through opening 53 the numeral zero and through opening 54 the numeral 1000. Shaft 50 is connected by any suitable driving means with shaft 32 (Fig. 1), which carries the arm 33 and the crank 37. In this particular case I have shown this connection made by a chain or cord which passes around suitable drives or pulleys 57 and 58 on the shafts 50 and 32 respectively so that as the shaft 32 is rotated supplemental indicator 51 will be correspondingly moved.

As thus described loads within the capacity of dial 14, 1000 pounds in this case, can be weighed in the usual manner without affecting the position of the cage or the poise weights supported therein or the position of dial 51, the weight on the platform being counterbalanced by pendulum 6 and indicated on dial 14. With a load on the platform greater than the capacity of dial 14, the indicating hand moves to the blank section beyond the 1000 mark and between 1000 and zero. At the same time beam 2 is raised to its uppermost position against poles or stops 18 and consequently pawl 43 of bell crank 42 is withdrawn out of line with shoulders 41, as previously explained. Also as beam 2 reaches its highest position, plate E is brought into contact with poles 18, thus completing the current of the electromagnet parts, and magnetizing electromagnet A, which has sufficient power to attract trip arm 36 until the consequent rotating of shaft 35 releases finger 34 from arm 33, when the weight of the cage rotates shaft 32, and the cage descends, as heretofore explained. The degree of the descent of the cage is governed by the weight of the load, for whenever sufficient counterpoise weight is deposited on the poise pendant by the descending cage plus the counterpoise weight of the pendulum, to more than counterbalance the weight of the load, beam 2 moves down from its highest position, link 44 releases bell crank arm 42 which takes its normal position, bringing pawl 43 in line to engage the proper shoulder on the cage and thus prevent a further descent thereof. For example; with a load of 1200 pounds, when one (1) counterpoise weight is deposited on the poise pan, sufficient counterweight is added to more than counterbalance the load. Hence beam 2 moves down, link 44 releases bell crank 42, pawl 43 engages the first shoulder on the cage and prevents further descent thereof. With a load of 9200 pounds the above operation will be repeated except that the cage will be permitted to descend until nine (9) poise weights have been deposited on the poise pan. Then pawl 43, after the eighth shoulder has passed will move in line and engage the ninth shoulder. As heretofore explained dial 51 moves in unison with the cage so that when the latter descends the figures at opening 54 are withdrawn and the figures at the opening 53 changed so as to represent the weight value of the poise weight or weights deposited on the poise pan.

Fig. 5 illustrates the position of the parts with a load of 5500 pounds on the platform. After weighing a load exceeding the capacity of dial 14, the hand will return to 0 when the cage has been returned to its normal position by operating crank 37 and the load removed. But it will not be necessary to return the cage to normal position when succeeding loads are of similar or greater weight. In such cases, it is only necessary to again raise or release trip 36, but as the cage 26 is now resting on pawl 43 the weight of a succeeding load, causing an upward movement of beam 2, may not be sufficient to withdraw pawl 43. Therefore trip 36 is connected by link 59 to one end of lever 58, pivoted in the casing and having at its opposite end a rigid part formed with shoulder 60. When the trip 36 is raised shoulder 60 pushes out bell crank arm and disengages pawl 43. It will now be understood that, when the added counterpoise weight more than counterbalances the load, beam 2 moves down to the point of equilibrium in unison with the movement of the pendulum weight to counterbalance the load. It will now be manifest that the weight of any load within the capacity of the scale will be automatically counterbalanced and the weight automatically indicated at opening 53 plus the indication on dial 52.

My invention is operative either with or without the electrical parts or should said parts become inoperative as trip 36 can be manually operated. Fig. 1 shows construction employing the electrical parts while Figs. 3 and 4 show construction requiring manual operation of trip 36.

Inasmuch as the movement which withdraws the pawl 43 on the bell crank 42 must take place after the indicating hand reaches the limit of the primary indication and enters in the non-graduated section on the dial, there is a possibility that, when the load on the scale is but a trifle over the amount represented by the multiple weights 24, such for instance as in this case two thousand and five pounds, the addition of one weight or one thousand pounds might move the beam back sufficiently to allow pawl 43 to engage the cage and thus drop one weight too few. This is particularly true when the trip is operated manually. In such case the trip is again operated by the handle 36ᵃ, which causes the shoulder 60 to move outwardly and force the pawl 43 out of engagement and thus allows the cage to drop another notch. In other words, if after tripping arm 36 the indicator should still remain in blank section a second tripping will cause another weight to be deposited and an accurate counterbalance will result. When the electromagnetic arrangement is used the adjustment may be made finer and is not so likely to occur, and in any event it only occurs in a scale in which the dial represents a large capacity scale and when the load is approximately equal to that represented by the capacity of the dial or multiples thereof.

The stop 61 projecting from the case is provided to limit the movement of the bell crank arm 42.

A distinctive feature of this invention is that for weighing a load of dial capacity or less than dial capacity, there is shown an automatic weighing machine, preferably of the pendulum type which is complete in and of itself and operates independent of the supplemental counter-balancing device. For all purposes the supplemental counterbalancing device is only called into use for weighing loads exceeding the dial capacity and until required for that kind of weighing it is entirely disconnected from the scale proper, but is adapted to be put into operation when needed and then becomes a part of the automatic weighing machine. By employing in this supplemental counterbalancing device a weight supporting device of the character described herein, there is little or no danger of inaccurate results and it will be apparent that unless the parts are accurately connected together, the machine cannot operate properly. For instance, if a load upon the platform weighs sixty-nine hundred and ninety pounds the movement of the weight supporting carrier must be accurately arranged lest it move a little too far and thereby deposit another one thousand pound weight upon the poise, applying counter-balance thereby for a load of seven thousand pounds instead of sixty-nine hundred. There is purposely employed a substantially rigid supporting member normally disconnected from the scale.

Having thus described my invention, I claim:

1. The combination of a load receiver, a beam, a counter-balance and indicating devices comprising a machine complete in itself for automatically indicating the weights of loads applied to said receiver with supplemental parts including an additional indicating device and a supporting member and supplemental counterbalances thereon coöperating with said additional indicating device, means for holding said supplemental parts disconnected from the first mentioned scale whereby the first mentioned scale may operate independent of said parts, means for shifting said supplemental counterbalances from said supporting member, and means connected with said first mentioned scale for receiving counterbalances applied to it from said supporting member, substantially as specified.

2. The combination of a load receiver, a beam, a counterbalance normally connected to said beam, and an indicating device, comprising an automatic pendulum scale for weighing loads applied to said receiver, with a supplemental counter-balancing device comprising a supplemental rigid supporting member, and a plurality of counterbalances supported thereby, means for normally holding said supporting device, and means for releasing said device for applying automatically additional counter-balance to said beam, substantially as specified.

3. In a scale, the combination of a load receiver, a beam fulcrumed at a point intermediate its ends, a pendulum counterbalance connected to said beam near one end thereof, a dial indicating device connected to said beam for automatically indicating the weights of primary loads, and a supplemental movable counter-balancing device normally disconnected from the scale whereby the scale will indicate the weights of primary loads independent of the supplemental counter-balancing device, said last mentioned device comprising a carrier and counter-balances supported thereby, said carrier being operated by gravity, and means for holding said carrier, together with means for releasing same for automatically applying counter-balance to said beam for the purpose specified.

4. In a scale, a load receiver, a counterpoise adapted in different positions to support different loads on said load receiver, an indicator indicating the different positions of said counter-poise, supplemental weights normally separated from, but adapted to be connected to, said counter-poise, a support for said weights, and a counterbalancing device for said support, and a manually operated trip for said support and a supplemental trip automatically operated by the movement of the counterpoise when the supplementary weights counterbalance the load on the receiver.

5. In a scale as described, a weight beam, a weight receiver on said beam, a series of weights carried in proximity to said weight receiver, but detached therefrom, a support for said weights having projections of different lengths, projections of correspondingly different lengths on said weights, the projections on the support and on the weights being arranged in sets, the projections for each set being staggered with reference to the projections of the other set as set forth.

6. In a scale as described, in connection with a pivoted beam, a weight receiver connected to said beam, and a weight support adjacent said weight receiver but detached therefrom, weights normally in said weight support, a holding device for said support, manually operated means for said holding device, said holding device including a latch connected to said manually operated means to hold said support until the holding mechanism is released, and an automatically operated holding mechanism connected with and operated by said beam when in one position to release said weights and in another position to engage said weight support and prevent the further movement of said weights as set forth.

7. In a scale, a vibrating beam, a weight receiver connected thereto, a counterpoise in the form of a pendulum also connected to said beam, an auxiliary or tare beam, an indicator connected to said beam adapted to show the load on the receiver as determined by the position of said beam, a dash pot for said beam, a weight receiver also connected to said beam, a weight support carrying weights each representing a counterbalancing effect equal to the capacity of the indicator, a dash pot for said support, means for holding said weight support in its normal position and for releasing same, and tripping mechanism actuated by said beam when in one position to permit said weight support to descend and successively deposit said weights on said weight receiver under the influence of said dash pot until said beam moves from its said position and to automatically engage and hold said support when said weights have been deposited, and an indicator connected to said support to indicate the number of weights deposited as and for the purpose specified.

8. In a scale as described, a weight support and a weight receiver, a series of weights in said weight support each having projecting arms, and a series of projections in said weight support, said weight support and supporting projections being arranged in sets with the supporting bars in one set staggered with reference to the bars of the other set and the supporting projections in the different sets being of different length whereby the weights may be separately supported and spaced and be permitted to be successively deposited on the weight receiver by the movement of the weight support as set forth.

9. In a scale as described, a weight support and weight receiver, a series of weights in said weight support, a moving counterbalancing part to which said weight receiver is attached, and a bell crank arm having a pawl adapted to be operated by said moving part, and projections on said weight support corresponding to the weights in said support to be engaged by said pawl whereby the movement of the moving counterpoise will automatically release or retain the weight support.

10. In a scale or weighing machine, a load receiver, a primary counterpoise, an indicator operating in unison therewith to indicate the weight of loads within the limit of the said counter-poise; auxiliary counterpoise devices normally disconnected from the scale adapted to be adjusted to provide additional counterpoise to counterbalance loads exceeding the limit of the primary counterpoise and means for changing the indication with each said load so as to indicate the weight thereof, through the capacity of the scale.

11. In a scale such as described, having a primary counter-balancing device and supplemental counterbalancing devices, means for holding same normally inactive but adapted to become active by means influenced by the load so as to add sufficient counterbalances to counterbalance the load, a tripping device forming a part of said means, and a supplemental tripping device adapted to operate the main tripping device, as and for the purpose specified.

12. In a scale or weighing machine, the combination of an indicator and a primary counterbalancing device, a supplemental counterbalance movable independent of the primary device and connections from said supplemental device to said primary device for automatically arresting said supplemental device, manually operated means, and an actuating device connected therewith for disengaging said connections between the primary and supplemental counterbalance, connections between the indicator and both counterbalancing devices for the purpose specified.

In testimony whereof, I have hereunto set my hand this 8th day of March, 1912.

HORATIO BONAR OSGOOD.

Witnesses:
 Effa M. Smith,
 Chas. I. Welch.